United States Patent
Shin et al.

(10) Patent No.: US 9,014,107 B2
(45) Date of Patent: Apr. 21, 2015

(54) DATA TRANSMISSION METHOD FOR DETACHED MACHINE TYPE COMMUNICATION DEVICE AND MOBILE COMMUNICATION SYSTEM PROVIDING MACHINE TYPE COMMUNICATION SERVICE

(75) Inventors: Jae Wook Shin, Daejeon (KR); Ae Soon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 25 days.

(21) Appl. No.: 13/331,393

(22) Filed: Dec. 20, 2011

(65) Prior Publication Data

US 2012/0155404 A1 Jun. 21, 2012

(30) Foreign Application Priority Data

Dec. 21, 2010 (KR) ........................ 10-2010-0132002

(51) Int. Cl.
*H04W 60/04* (2009.01)
*H04W 60/06* (2009.01)
*H04W 68/00* (2009.01)

(52) U.S. Cl.
CPC .............. *H04W 60/04* (2013.01); *H04W 60/06* (2013.01); *H04W 68/005* (2013.01)

(58) Field of Classification Search
None
See application file for complete search history.

(56) References Cited

U.S. PATENT DOCUMENTS

| 8,165,068 B2 * | 4/2012 | Zhao et al. ..................... 370/328 |
| 2009/0285157 A1 * | 11/2009 | Yeoum et al. ................. 370/328 |
| 2010/0054472 A1 * | 3/2010 | Barany et al. ................. 380/270 |
| 2010/0061331 A1 * | 3/2010 | Guo et al. ..................... 370/329 |
| 2010/0093353 A1 * | 4/2010 | Bu et al. ........................ 455/436 |
| 2010/0130171 A1 * | 5/2010 | Palanigounder et al. ..... 455/411 |
| 2010/0220689 A1 * | 9/2010 | Hu et al. ........................ 370/331 |

FOREIGN PATENT DOCUMENTS

| KR | 1020070029346 | 3/2007 |
| KR | 1020100005669 | 1/2010 |

OTHER PUBLICATIONS

Chandra S. Bontu and Ell Illidge, "DRX Mechanism for Power Saving in LTE", Jun. 2009, Publisher: IEEE Communications Magazine, p. 48-55.*
Institute for Information Industry (III), Coiler Corporation, "Load Analysis for MTC Devices in Idle Mode or Detached State," 3GPP TSG-RAN WG2 #70bis, R2-103619 (2010).

* cited by examiner

*Primary Examiner* — Ian N. Moore
*Assistant Examiner* — Latresa McCallum
(74) *Attorney, Agent, or Firm* — Nelson Mullins Riley & Scarborough LLP

(57) ABSTRACT

Provided are a data transmission method for a detached machine type communication (MTC) device and a mobile communication system providing an MTC service. The method includes sensing an MTC device performing a detachment procedure from a network, when the MTC device being detached is sensed, storing, at a first gateway (GW), context information about the MTC device being detached from the network, storing, at the detached MTC device, context information that has been lastly allocated and used before the detachment, receiving, at the first GW, downlink data transmitted from an MTC server to the detached MTC device, and buffering the received data, transmitting a paging message to the detached MTC device, and performing, at the MTC device receiving the paging message, an attachment process to the network, and receiving the DL data buffered in the first GW.

12 Claims, 3 Drawing Sheets

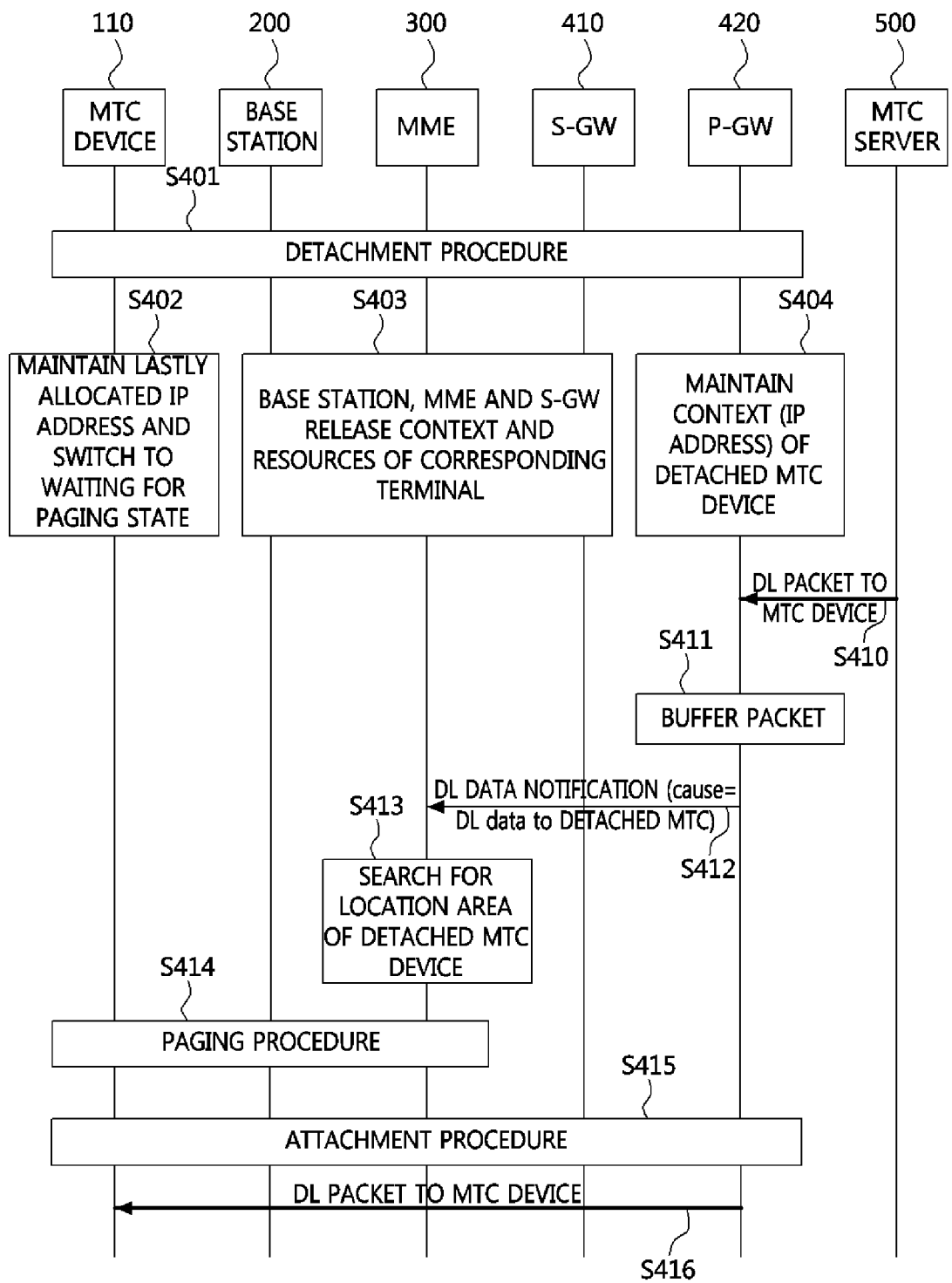

US 9,014,107 B2

DATA TRANSMISSION METHOD FOR DETACHED MACHINE TYPE COMMUNICATION DEVICE AND MOBILE COMMUNICATION SYSTEM PROVIDING MACHINE TYPE COMMUNICATION SERVICE

CLAIM FOR PRIORITY

This application claims priority to Korean Patent Application No. 10-2010-0132002 filed on Dec. 21, 2010 in the Korean Intellectual Property Office (KIPO), the entire contents of which are hereby incorporated by reference.

BACKGROUND

1. Technical Field

Example embodiments of the present invention relate in general to a data transmission method for a detached machine type communication (MTC) device, whereby downlink (DL) data is effectively transmitted to the detached MTC device, in a Third Generation Partnership Project (3GPP) Long Term Evolution (LTE)-Advanced mobile communication system providing an MTC service, and a mobile communication system providing an MTC service.

2. Related Art

In conventional mobile communication systems, terminals are generally used for human-to-human (H2H) communication. However, MTC in LTE-Advanced systems has lately been actively researched as a new application.

MTC or machine-to-machine communication (M2M) is a form of data communication which involves one or more entities that do not necessarily need human interaction. A service optimized for MTC differs from a service optimized for H2H communication. In comparison with a current mobile network communication service, the MTC service can be characterized by a) several market scenarios, b) data communications, c) lower cost and less effort, d) a potentially larger number of communicating terminals, e) a wider service area, and f) very low traffic per terminal.

MTC may be implemented in various forms of service, for example, smart metering, tracking and tracing, remote maintenance and control, and e-health.

Lately, 3GPP has also been working on MTC standardization for intelligent communication between a human and an object and between objects. For various types of MTC applications having main functions of smart metering, remote control, etc., a huge number of MTC devices are disposed and managed. In the case of smart metering, an MTC device periodically transfers measurement information, or transmits measurement information to a designated MTC server in a network when the MTC server requests the information. The number of MTC devices is far greater than that of general (H2H) terminals, but in most cases, a small amount of data is transmitted at only a specific point in time.

In 3GPP LTE systems, either of an MTC device and general user is treated as one terminal and needs to be individually registered in an LTE-Advanced network. The disposition of multiple MTC devices causes scheduling competition for channel allocation, exhaustion of radio resources, overload resulting from signal generation, and so on, thereby exerting a bad influence on existing general users. With an emphasis put on minimization of the adverse effects caused by the disposition of MTC devices, 3GPP has been working on standardization.

States of a terminal in a mobile communication system are generally classified into an attached state and a detached state. A terminal in the detached state has not been registered in a network, and the network cannot track the terminal. Due to characteristics of a providing service, an MTC device has far more cases of being maintained in the detached state than a general terminal. However, current LTE-Advanced systems do not support DL data transmission to a detached terminal. Thus, when a plurality of MTC devices are in the detached state and an MTC server requests DL data transmission to an MTC device, it is impossible to properly transfer DL data.

SUMMARY

Accordingly, example embodiments of the present invention are provided to substantially obviate one or more problems due to limitations and disadvantages of the related art.

Example embodiments of the present invention provide a data transmission method for a detached machine type communication (MTC) device causing, when an MTC device performs a detachment procedure from a network, the MTC device to stand by in a paging channel receiving state, and a packet data network (PDN) gateway (P-GW) in the network to maintain an Internet protocol (IP) address of the detached MTC device, and causing, when downlink (DL) data transmitted to the detached MTC device is received from an MTC server, a mobility management entity (MME) to trigger a paging procedure to the detached MTC device, and the MTC device receiving a paging message to perform an attachment procedure, and a mobile communication system using the data transmission method.

In some example embodiments, a data transmission method for a detached MTC device in a mobile communication network including at least one MTC device includes: sensing an MTC device performing a detachment procedure from the network; when the MTC device being detached is sensed, storing, at a first gateway (GW), context information about the MTC device being detached from the network; storing, at the detached MTC device, context information that has been lastly allocated and used before the detachment; receiving, at the first GW, DL data transmitted from an MTC server to the detached MTC device, and buffering the received data; transmitting a paging message to the detached MTC device; and performing, at the MTC device receiving the paging message, an attachment process to the network, and receiving the DL data buffered in the first GW.

The context information about the MTC device may be an IP address or international mobile subscriber identity (IMSI) of the MTC device.

The data transmission method may further include, when the MTC device being detached is sensed, releasing, at a base station, an MME, and a serving GW (S-GW) that have been connected with the MTC device performing the detachment procedure, the context information about the detached MTC device and all resources allocated to the detached MTC device.

Also, the data transmission method may further include waking up, at the detached MTC device, at a specific point in time according to a predetermined period, and checking whether a paging message corresponds to the context information about the detached MTC device.

Also, the data transmission method may further include transmitting, at the first GW receiving the DL data transmitted to the detached MTC device, a DL data notification message to an MME.

Here, a cause value included in the DL data notification message may be set to "DL Data to Detached MTC."

Transmitting the paging message to the detached MTC device may include: searching for, at the MME receiving the DL data notification message, a location area of the MTC device; when the search for the location area of the MTC device is completed, transferring the paging message to a base station present in the location area; and transmitting, at the base station receiving the paging message, the paging message.

The MME may use information about at least one of a location area lastly registered before the MTC device switched to a detached state, a list of location areas permitted to the MTC device, and at least one location area which the MTC device has moved to most recently and registered, as a location of the MTC device for paging.

The first GW may be a P-GW.

In other example embodiments, a mobile communication system providing an MTC service includes: an MTC device configured to, when detached from a network, store context information that has been lastly allocated and used before the detachment; and a first GW configured to, when sensing the MTC device being detached, store the context information about the MTC device detached from the network, receive DL data transmitted from an MTC server to the detached MTC device, buffer the received data, and trigger paging to the detached MTC device. Here, the detached MTC device wakes up at a specific point in time according to a predetermined period, checks whether a paging message corresponds to the context information about the MTC device, and when a paging message for the MTC device is received, performs an attachment process to the network and receives the DL data buffered in the first GW.

The mobile communication system may further include an MME configured to receive a DL data notification message indicating the DL data transmitted from the first GW to the detached MTC device, search for a location area of the detached MTC device, and transfer the paging message to a base station present in the location area.

The mobile communication system may further include the base station configured to, when the MTC device being detached is sensed among at least one connected MTC device, release the context information about the detached MTC device and all resources allocated to the detached MTC device, and when the paging message for the detached MTC device is received from the MME, transmit the paging message to the detached MTC device.

The mobile communication system may further include a second GW configured to, when the MTC device being detached is sensed among at least one connected MTC device, release the context information about the detached MTC device and all resources allocated to the detached MTC device, receive the paging message for the detached MTC device from the MME, and forward the paging message to the base station.

In other example embodiments, an MTC device present in a mobile communication system providing an MTC service and communicating with a network stores, when detached from the network, context information that has been lastly allocated and used before the detachment, even in a detached state, wakes up at a specific point in time according to a predetermined period and checks whether a paging message corresponds to the context information about the MTC device itself, and when a paging message for the MTC device is received, performs an attachment procedure to the network and receives DL data buffered in the network.

In other example embodiments, a GW relaying data between a base station and an MTC server in a mobile communication system providing an MTC service stores, when sensing an MTC device being detached, context information about the MTC device being detached from a network, receives DL data transmitted from the MTC server to the detached MTC device, buffers the received data, and triggers paging to the detached MTC device.

BRIEF DESCRIPTION OF DRAWINGS

Example embodiments of the present invention will become more apparent by describing in detail example embodiments of the present invention with reference to the accompanying drawings, in which:

FIG. 4 is a flowchart illustrating operation for transmitting DL traffic to an MTC device in a detached state according to an example embodiment of the present invention.

DESCRIPTION OF EXAMPLE EMBODIMENTS OF THE PRESENT INVENTION

Figure 1:
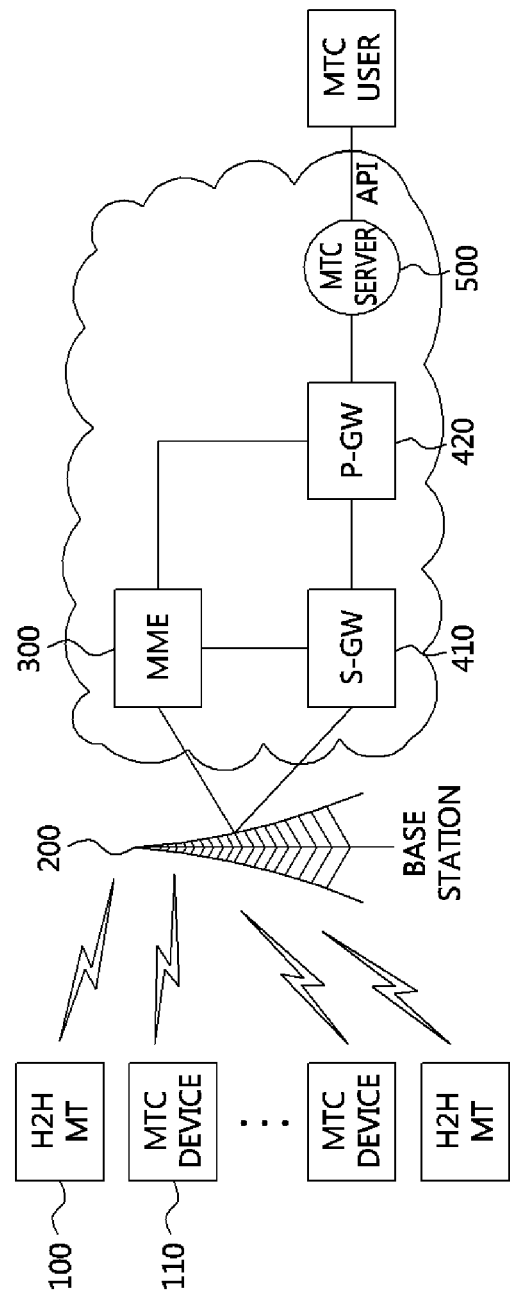
FIG. 1 illustrates a wireless communication network that provides a machine type communication (MTC) service to which example embodiments of the present invention are applied.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising,"

"includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The term "terminal" used herein may be referred to as a mobile station (MS), user equipment (UE), user terminal (UT), wireless terminal, access terminal (AT), subscriber unit, subscriber station (SS), wireless device, communication device, wireless transmit/receive unit (WTRU), moving node, mobile, or other terms. Various example embodiments of a terminal may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

The term "base station" used herein generally denotes a fixed point communicating with a terminal, and may be referred to as a Node-B, evolved Node-B (eNB), base transceiver system (BTS), access point (AP), and other terms.

Hereinafter, example embodiments of the present invention will be described in detail with reference to the appended drawings. To aid in understanding the present invention, like numbers refer to like elements throughout the description of the figures, and the description of the same component will not be reiterated.

The present invention relates to a method of transmitting downlink (DL) data to a machine type communication (MTC) device in a detached state in a Third Generation Partnership Project (3GPP) Long Term Evolution (LTE)-Advanced mobile communication system. The method causes, when an MTC device performs a detachment procedure from a network, the MTC device to stand by in a paging channel receiving state, and a packet data network (PDN) gateway (P-GW) in the network to maintain an Internet protocol (IP) address of the detached MTC device, and causes, when the P-GW receives DL data transmitted from an MTC server to the detached MTC device, a mobility management entity (MME) to be notified of the DL data and trigger a paging procedure to the detached MTC device, and the MTC device receiving a paging message to perform an attachment procedure, thereby effectively transmitting the DL data to the detached MTC device.

FIG. 1 illustrates a wireless communication network that provides an MTC service to which example embodiments of the present invention are applied.

As shown in FIG. 1, a wireless communication network to which example embodiments of the present invention are applied may include general terminals, that is, human-to-human (H2H) mobile terminals (MTs) 100, a base station 200, a mobility management entity (MME) 300, a serving-gateway (S-GW) 410, a P-GW 420, and an MTC server 500.

The base station 200 controls radio resources while communicating with a terminal through a wireless interface. The MME 300 controls bearers in the network while controlling mobility of a terminal and a service session. The S-GW 410 and the P-GW 420 provide bearers for traffic transmission and a routing function. In particular, the P-GW 420 provides a function of interoperating with an external packet network.

As shown in FIG. 1, the wireless communication network providing an MTC service may include the MTC server 500 for providing the MTC service, MTC devices 110, an MTC user, etc. in addition to an existing wireless communication network.

The MTC server 500 communicates with a public land mobile network (PLMN), and communicates with the MTC devices 110 via the PLMN. Also, the MTC server 500 has an interface that can be accessed by the MTC user, and provides service for the MTC user. The MTC user utilizes the service provided by the MTC server 500.

In the constitution of FIG. 1, the MTC server 500 is controlled by a network operator. The network operator provides an application programming interface (API) on the MTC server 500, and the MTC user accesses the MTC server 500 of the network operator through the API. Here, the MTC server 500 may be included in a network operator domain as shown in FIG. 1, but may be located outside the network operator domain.

In relation to an MTC service, terminals may be generally classified into two types as shown in FIG. 1, that is, the H2H MTs 100 used for communication between humans and the MTC devices 110 used for communication between a general terminal and a machine.

The MTC devices 110 communicate with the MTC server 500 or each other via an International Mobile Telecommunication (IMT)-Advanced network. The MTC server 500 interoperates through the P-GW 420, and serves to collect or transfer specific information from/to the MTC devices 110, thereby controlling the MTC devices 110.

Such MTC devices 110 number much greater than the H2H MTs 100. Most of the MTC devices 110 are fixed at specific locations or have limited mobility, and transmit a small amount of data periodically or only when a specific event occurs. To accommodate many such MTC devices, wireless and wired resources and computing resources allocated to the MTC devices need to be kept minimized. To this end, a system needs to be optimized to fully reflect mobility and traffic characteristics of the MTC devices.

Figure 2:
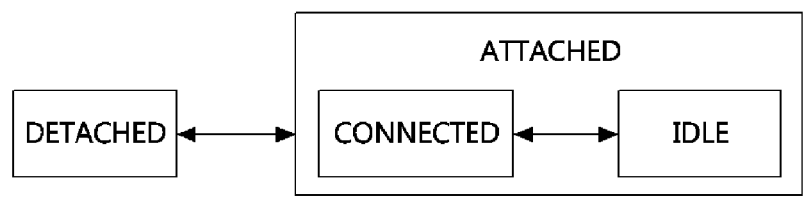
FIG. 2 illustrates state transition of a terminal according to example embodiments of the present invention.

FIG. 2 illustrates state transition of a terminal according to example embodiments of the present invention.

In general, states of a terminal are classified into an attached state and a detached state, as shown in FIG. 2.

A terminal in the detached state has not been registered in a network. The network cannot track the terminal, and can only maintain information about a location area lastly registered before the terminal is detached. To provide service and manage a location, the terminal in the detached state needs to switch to the attached state.

The attached state is classified again into an idle state or a connected state. In the connected state, signaling and traffic channels have been established between a terminal and a base station/network, and in the idle state, the signaling and traffic channels have been released between the terminal and the base station/network. The terminal may switch to the idle state when data transmission is not performed for a predetermined time in the connected state, and switch to the connected state when traffic occurs in the idle state.

In terms of resource occupation, a large amount of resources are occupied in the connected state compared to the idle state, and in the idle state compared to the detached state. Thus, in terms of use of overall system resources, it is efficient for terminals such as MTC devices, which are large in number, low in traffic frequency and have a small amount of traffic, to be maintained in the idle state rather than the connected state, and in the detached state rather than the idle state. For this reason, a method of switching an MTC device to the detached state when data transmission is not performed for a predetermined time and switching the MTC device back to the connected state when data transmission is resumed is preferable as a technique for optimizing resource use of an MTC device. Operation that an MTC device needs to perform in the detached state to resume data transmission will be described in detail below.

In an LTE-Advanced system, data transmission between a terminal and a network may be triggered by the terminal or the network.

When uplink data transmission is triggered by a terminal in the idle state, the terminal first switches to the connected state through a signaling connection procedure, and then transmits the corresponding data. When DL data transmission is triggered by a network in the idle state, the network performs a paging procedure to a location area that a terminal has lastly registered to call the terminal. After the called terminal switches to the connected state through a signaling connection procedure, the corresponding data is transmitted from the network to the terminal.

To a terminal in the connected state, data is transmitted through a previously established traffic channel regardless of which one of the terminal and a network triggers data transmission.

When uplink data transmission is triggered by a terminal in the detached state, the terminal may perform an attachment procedure to a network to switch to the connected state, and then perform the data transmission.

However, a problem occurs when an MTC server in a network transmits DL data to an MTC in the detached state. In other words, a P-GW of a current LTE-Advanced system immediately discards DL data transmitted to a terminal in the detached state.

In an example embodiment of the present invention for solving this problem, a P-GW recognizes a DL packet transmitted to a terminal in the detached state, calls the terminal in the detached state to cause the terminal to switch to the attached state, and then forwards the DL data.

Figure 3:
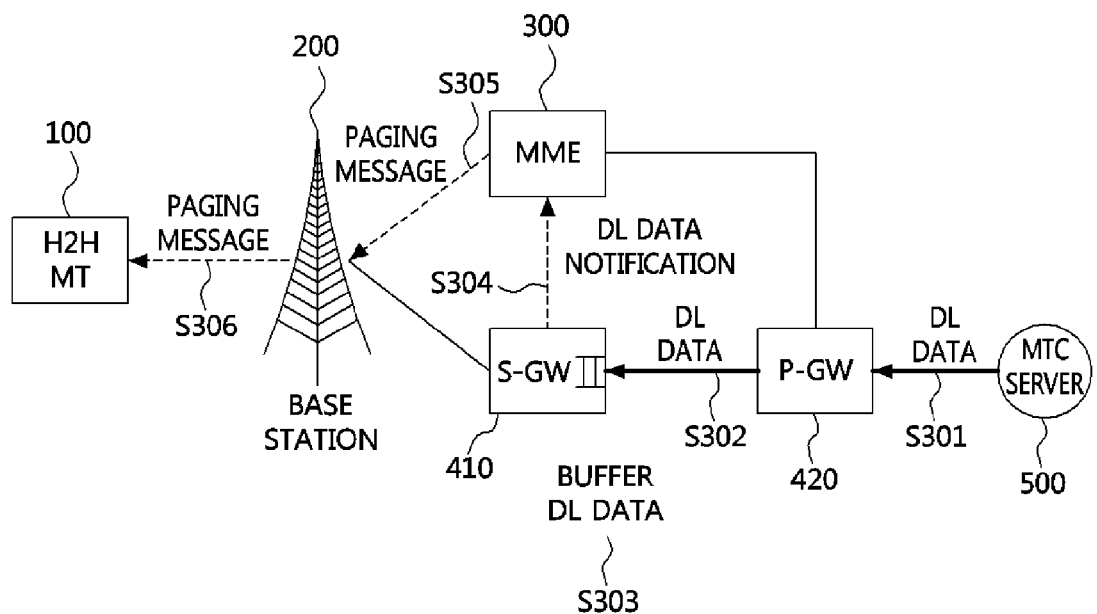
FIG. 3 is a flowchart illustrating operation for transmitting downlink (DL) data to a general terminal in an idle state in a general mobile communication system.

FIG. 3 is a flowchart illustrating operation for transmitting DL data to a general terminal in the idle state in a general mobile communication system.

In general, when a terminal 100 switches to the idle state, context information about the terminal 100 is removed from a base station 200.

At this time, signaling and traffic channels between the terminal 100 and the base station 200, an MME 300 and an S-GW 410 are released, but a traffic channel based on a general packet radio service (GPRS) tunneling protocol (GTP) between the S-GW 410 and a P-GW 420 is maintained.

Subsequently, DL data transmitted to the terminal 100 passes through the P-GW 420 (S301) and is received by the S-GW 410 (S302). When the terminal 100 is in the idle state, the S-GW 410 first buffers the received DL traffic (S303). Then, the S-GW 410 transfers a DL data notification message to the MME 300 (S304), thereby triggering paging of the MME 300.

Using location information about the terminal 100, the MME 300 transfers a paging message to the base station 200 present in a location area lastly registered by the terminal 100 (S305). The base station 200 receiving the paging message performs paging to the terminal 100 through a wireless interface (S306). When the terminal 100 receives the paging message and checks that the terminal 100 itself has been paged, the terminal 100 performs a signaling connection procedure for switching from the idle state to the connected state and then establishes a traffic channel. The S-GW 410 transmits the DL data buffered for the terminal 100 to the terminal 100 through the established traffic channel.

FIG. 4 is a flowchart illustrating operation for transmitting DL traffic to an MTC device in the detached state according to an example embodiment of the present invention.

When it is determined that no more data exchange with an MTC server 500 is needed, an MTC device 110 performs a detachment procedure from a network (S401). When detachment of the MTC device 110 is completed, information (context) about the MTC device 110 and allocated wireless and wired resources are all released by the base station 200, an MME 300, and an S-GW 410 (S403).

However, a P-GW 420 interoperating with the MTC server 500 maintains the context of the MTC device in the detached state as it is (S404). Context of an MTC device according to an example embodiment of the present invention may be an IP address of the MTC device, an international mobile subscriber identity (IMSI) of the MTC device, and so on.

Also, the MTC device 110 in the detached state maintains an IP address that has been lastly allocated and used before in the connected state as it is, and waits to receive a paging message transmitted through a radio paging channel (S402). In an example embodiment of the present invention, a paging channel is received using a discontinuous reception (DRX) mechanism. In the DRX mechanism, an MTC device wakes up only at a specific point in time according to a predetermined period to receive a paging channel and check whether the MTC device itself has been paged.

Subsequently, when the P-GW 420 receives DL data from the MTC server 500 and determines that the DL data is transmitted to the MTC device 110 in the detached state (S410), the P-GW 420 buffers the DL data (S411) and transmits a DL data notification message to the MME 300 (S412). At this time, a cause value included in the DL data notification message is set to "DL Data to Detached MTC."

When the DL data notification message whose cause value is set to "DL Data to Detached MTC" is received from the P-GW 420, the MME 300 searches for a location area of the MTC device 110 (S413).

Since the MTC device 110 is fixed at a specific location or moves in a limited area only, there is a strong possibility of the MTC device 110 being present in a location area lastly registered before the MTC device 110 switches to the detached state, one of location areas permitted to the MTC device 110, and one of at least one location area which the MTC device 110 has moved to most recently and registered. Thus, in an example embodiment of the present invention, information about at least one of a location area lastly registered before an MTC device switches to the detached state, a list of location areas permitted to the MTC device, and at least one location area which the MTC device has moved to most recently and registered is used as a location of the MTC device for paging.

When the search for the location area of the MTC device 110 is completed, the MME 300 transfers a paging message to the base station 200 present in the area, and the base station 200 forwards the paging message (S414). When the paging message which calls the MTC device 110 is received, the MTC device 110 in the detached state performs an attachment procedure to the network (S415). When the attachment procedure is completed, the P-GW 420 transmits the buffered DL packet data to the MTC device 110 using a traffic channel established through the attachment procedure (S416).

In example embodiments of the present invention, when data transmission does not occur for a predetermined time in an IMT-Advanced network supporting many MTC devices and an MTC device switches to the detached state, a final IP address allocated to the MTC device is maintained in the MTC device and a P-GW, and the MTC device stands by in a paging channel receiving state, and when the P-GW receives DL data transmitted from an MTC server to the detached MTC device, the corresponding DL packet is buffered, an MME triggers paging to the MTC device, and the MTC device performs an attachment procedure to the network, thereby enabling DL data transmission. Consequently, the MTC server can effectively transmit the DL data to the detached MTC device.

While the example embodiments of the present invention and their advantages have been described in detail, it should be understood that various changes, substitutions and alterations may be made herein without departing from the scope of the invention.

What is claimed is:

1. A data transmission method for a detached machine type communication (MTC) device in a mobile communication network including at least one MTC device, the method comprising:
    sensing a MTC device performing a detachment procedure from the network;
    when the MTC device being detached is sensed, storing, at a first gateway (GW), context information about the MTC device being detached from the network, wherein the detached MTC device is not registered in the network and is unable to receive downlink (DL) data transmissions;
    storing, at the detached MTC device, context information that has been lastly allocated and used before the detachment;
    receiving, at the first GW, DL data transmitted from a MTC server to the detached MTC device, and buffering received data;
    transmitting, at the first GW receiving the DL data transmitted to the detached MTC device, a DL data notification message to a mobility management entity (MME), wherein the MME uses information about at least one of a location area lastly registered before the MTC device switched to a detached state, a list of location areas permitted to the MTC device, and at least one location area which the MTC device has moved to most recently and registered, as a location of the MTC device for paging,
    transmitting a paging message to the detached MTC device; and
    performing, at the MTC device receiving the paging message, an attachment process to the network, and receiving the DL data that has been buffered in the first GW.

2. The data transmission method of claim 1, wherein the context information about the MTC device is an Internet protocol (IP) address or international mobile subscriber identity (IMSI) of the MTC device.

3. The data transmission method of claim 1, further comprising, when the MTC device being detached is sensed, releasing, at a base station, a mobility management entity (MME), and a serving GW (S-GW) that have been connected with the MTC device performing the detachment procedure, the context information about the detached MTC device and all resources allocated to the detached MTC device.

4. The data transmission method of claim 1, further comprising waking up, at the detached MTC device, at a specific point in time according to a predetermined period, and checking whether the paging message corresponds to the context information about the detached MTC device.

5. The data transmission method of claim 1, wherein a cause value included in the DL data notification message is set to "DL Data to Detached MTC."

6. The data transmission method of claim 1, wherein transmitting the paging message to the detached MTC device includes:
    searching, at the MME receiving the DL data notification message, for a location area of the MTC device;
    when the search for the location area of the MTC device is completed, transferring the paging message to a base station present in the location area; and
    transmitting, at the base station receiving the paging message, the paging message.

7. The data transmission method of claim 1, wherein the first GW is a packet data network (PDN) GW (P-GW).

8. A mobile communication system providing a machine type communication (MTC) service, comprising:
    a MTC device configured to, when detached from a network, store context information that has been lastly allocated and used before a detachment;
    a first gateway (GW) configured to, when sensing the MTC device being detached, store the context information about the MTC device detached from the network, wherein the detached MTC device is not registered in the network and is unable to receive downlink (DL) data transmissions, receive the DL data transmitted from a MTC server to a MTC device that has been detached, buffer the received data, and trigger paging to the detached MTC device,
    wherein the detached MTC device wakes up at a specific point in time according to a predetermined period, checks whether a paging message corresponds to the context information about the MTC device, and when the paging message for the MTC device is received, performs an attachment process to the network and receives the DL data buffered in the first GW, and
    a second GW configured to, when the MTC device being detached is sensed among at least one connected MTC device, release the context information about the detached MTC device and all resources allocated to the detached MTC device, receive the paging message for the detached MTC device from a mobility management entity (MME), and forward the paging message to a base station.

9. The mobile communication system of claim 8, wherein the context information about the MTC device is an Internet protocol (IP) address or international mobile subscriber identity (IMSI) of the MTC device.

10. The mobile communication system of claim 8, further comprising the MME configured to receive a DL data notification message indicating the DL data transmitted from the first GW to the detached MTC device, search for a location area of the detached MTC device, and transfer the paging message to the base station present in the location area.

11. The mobile communication system of claim 10, further comprising the base station configured to, when the MTC device being detached is sensed among at least one connected MTC device, release the context information about the detached MTC device and all resources allocated to the detached MTC device, and when the paging message for the detached MTC device is received from the MME, transmit the paging message to the detached MTC device.

12. The mobile communication system of claim 8, wherein the first GW is a packet data network (PDN) GW (P-GW).

* * * * *